United States Patent [19]
Rossio

[11] Patent Number: 5,441,654
[45] Date of Patent: * Aug. 15, 1995

[54] COMPOSITION FOR INHIBITING STRESS CRACKS IN PLASTIC ARTICLES AND METHODS OF USE THEREFOR

[75] Inventor: Charles E. Rossio, Carleton, Mich.

[73] Assignee: Diversey Corp., a Corp. of Canada, Mississauga, Canada

[*] Notice: The portion of the term of this patent subsequent to May 29, 2007 has been disclaimed.

[21] Appl. No.: 83,632

[22] Filed: Jun. 28, 1993

Related U.S. Application Data

[63] Continuation-in-part of Ser. No. 802,842, Dec. 6, 1991, Pat. No. 5,223,162, which is a continuation-in-part of Ser. No. 535,473, Jun. 8, 1990, Pat. No. 5,073,280, which is a continuation-in-part of Ser. No. 398,542, Aug. 25, 1989, Pat. No. 5,009,801, which is a continuation-in-part of Ser. No. 218,893, Jul. 14, 1988, Pat. No. 4,929,375.

[51] Int. Cl.⁶ ............................................. C10M 173/02
[52] U.S. Cl. ................................. 252/49.3; 252/50; 252/51.5 R
[58] Field of Search ........................................ 252/49.3

[56] References Cited

U.S. PATENT DOCUMENTS

| | | | |
|---|---|---|---|
| Re. 30,885 | 3/1982 | Rieder | 252/34 |
| 2,921,828 | 1/1960 | Caldwell | 8/4 |
| 3,066,113 | 11/1962 | Arnold | 260/45.4 |
| 3,186,946 | 6/1965 | Sluhan | 252/49.3 |
| 3,336,225 | 8/1967 | Sayad et al. | 252/34.7 |
| 3,350,346 | 10/1967 | Maxson | 260/45.7 |
| 3,352,787 | 11/1967 | Bodach | 252/103 |
| 3,372,117 | 3/1968 | Jones et al. | 252/42.1 |
| 3,374,171 | 3/1968 | Davis | 252/34.7 |
| 3,425,940 | 2/1969 | Norton | 252/8.5 |
| 3,507,792 | 4/1970 | Zuraw | 252/49.5 |
| 3,537,811 | 11/1970 | Stingl | 8/176 |
| 3,574,100 | 4/1971 | Wetmore | 252/32.5 |
| 3,583,914 | 6/1971 | Garvin et al. | 252/34.7 |
| 3,630,898 | 12/1971 | Teeter et al. | 252/49.3 |
| 3,672,977 | 6/1972 | Dardoutas | 117/138.8 |
| 3,718,588 | 2/1973 | Bellos et al. | 252/32.5 |
| 3,802,912 | 4/1974 | Otocka | 117/118 |
| 3,860,521 | 1/1975 | Aepli et al. | 252/49.3 |
| 3,903,042 | 9/1975 | Gall | 260/40 |
| 3,950,258 | 4/1976 | Imai et al. | 252/33 |
| 4,173,669 | 11/1979 | Ashida et al. | 428/35 |
| 4,229,553 | 10/1980 | Sterzal et al. | 525/430 |
| 4,274,973 | 6/1981 | Stanton et al. | 252/34.7 |
| 4,311,250 | 1/1982 | Ravve et al. | 220/458 |
| 4,328,108 | 5/1982 | Deeken | 252/8.6 |
| 4,369,156 | 1/1983 | Mathes et al. | 264/147 |
| 4,390,436 | 6/1983 | Hernandez | 252/49.3 |
| 4,390,439 | 6/1983 | Schwartz et al. | 252/73 |
| 4,419,251 | 12/1983 | Shim et al. | 252/32.7 |
| 4,486,324 | 12/1984 | Kurosec | 252/49.3 |
| 4,521,321 | 6/1985 | Anderson et al. | 252/49.3 |
| 4,529,761 | 7/1985 | Lohmeijer | 524/157 |
| 4,539,125 | 9/1985 | Sato | 252/32.7 E |
| 4,604,220 | 8/1986 | Stanton | 252/33.4 |
| 4,681,906 | 7/1987 | Abolins et al. | 524/166 |
| 4,701,477 | 10/1987 | Altenberg et al. | 521/167 |
| 4,737,523 | 4/1988 | White et al. | 521/91 |
| 4,759,861 | 7/1988 | Ogura et al. | 252/33 |
| 4,769,162 | 9/1988 | Remus | 252/18 |
| 4,778,614 | 10/1988 | Rawlinson et al. | 252/49.5 |
| 4,787,995 | 11/1988 | Nichols et al. | 252/49.5 |
| 4,802,998 | 2/1989 | Mueller et al. | 252/8.514 |
| 4,839,067 | 6/1989 | Jansen | 252/11 |
| 4,894,402 | 1/1990 | Abolins et al. | 524/157 |
| 4,925,582 | 5/1990 | Bennett | 252/49.3 |
| 4,929,375 | 5/1990 | Rossio et al. | 252/49.3 |
| 5,009,801 | 4/1991 | Wider et al. | 252/49.3 |
| 5,062,978 | 11/1991 | Weber et al. | 252/49.3 |
| 5,073,280 | 12/1991 | Rossio et al. | 252/49.3 |
| 5,132,046 | 7/1992 | Edebo et al. | 252/49.3 |
| 5,223,162 | 6/1993 | Rossio | 252/49.3 |
| 5,244,589 | 9/1993 | Liu et al. | 252/49.3 |

FOREIGN PATENT DOCUMENTS

| | | |
|---|---|---|
| 03027052 | 2/1989 | European Pat. Off. . |
| 0372628 | 6/1990 | European Pat. Off. . |

OTHER PUBLICATIONS

Avny et alia, "Chemical Modification of Polyester Fiber Surfaces by Amination Reactions with Multifunctional Amines". 32 Journal of Applied Polymer Science 4009–4025 (Aug. 1986).

*Primary Examiner*—Ellen M. McAvoy
*Attorney, Agent, or Firm*—Weintraub Duross & Brady

[57] ABSTRACT

Alkaline lubricants for use with glass, aluminum and PET containers and other articles of manufacture are prepared from water-soluble amines. Fatty acid lubricants prepared herefrom are rendered highly dilutable by employing myristic acid as at least a portion of the fatty acid component thereof. Synthetic diamine lubricants are prepared by using the water soluble amines as the hydrotrope for the synthetic diamine, without the neutralization thereof.

6 Claims, No Drawings

COMPOSITION FOR INHIBITING STRESS CRACKS IN PLASTIC ARTICLES AND METHODS OF USE THEREFOR

CROSS-REFERENCE TO RELATED APPLICATIONS

This application is a continuation-in-part application of co-pending U.S. patent application, Ser. No. 07/802,842, filed on Dec. 6, 1991, entitled "BOTTLE WASHING COMPOSITION FOR INHIBITING STRESS CRACKING AND METHOD OF USING SAME", now U.S. Pat. No. 5,223,162, the disclosure which is hereby incorporated by reference and which, in turn, is a continuation-in-part application of co-pending U.S. patent application Ser. No. 07/535,473, filed Jun. 8, 1990, for "COMPOSITION FOR INHIBITING STRESS CRACKS IN PLASTIC ARTICLES AND METHODS OF USE THEREFOR", now U.S. Pat. No. 5,073,280, the disclosure of which is hereby incorporated by reference and which, in turn, is a continuation-in-part of U.S. patent application Ser. No. 07/398,542, filed Aug. 25, 1989 for "COMPOSITIONS FOR PREVENTING STRESS CRACKS IN POLY (ALKYLENE TEREPHTHALATE) ARTICLES AND METHODS OF USE THEREFOR", now U.S. Pat. No. 5,009,801, the disclosure of which is hereby incorporated by reference and which, in turn, is a continuation in part application of U.S. patent application Ser. No. 07/218,893, filed Jul. 14, 1988, for "CONVEYOR LUBRICANT CONTAINING ALKYL AMINE COUPLING AGENTS, now U.S. Pat. No. 4,929,375, the disclosure of which is hereby incorporated by reference.

BACKGROUND OF THE INVENTION

FIELD OF THE INVENTION

In the above-referred to co-pending applications, there is disclosed both bottle washing and lubricant compounds which can, inter alia, inhibit the stress crack formation ordinarily encountered when exposing a poly (alkylene) terephthalate article, such as a beverage bottle, to an alkaline environment. This phenomenon is well known and has been widely documented.

The development of this technology is predicated on the fact that "fatty acid" lubricants in the alkaline pH range are highly desirable in a bottling operation not only because of its ability to clean the conveyors, due to the soap generated by the interaction between a caustic neutralizing compound and the fatty acid, but also because of its ability to neutralize any excess acidity encountered during spillage of a soda pop or the like. However, it is these fatty acid lubricants which contribute to the stress cracking because of their alkalinity. To minimize this, the art taught neutralization of the fatty acid lubricants. However, neutralization, that is pH 7.0, diminishes the lubricating capabilities as well as the cleaning capabilities of these compounds. Thus, in the prior copending application solutions were sought to find a fatty acid lubricant which could inhibit the stress cracking phenomenon while still being a good lubricant and cleaner. This, initially, and in accordance with the teachings of U.S. Pat. No. 4,929,375, it was believed that by admixing a hydrophilic-substituted aromatic hydrocarbon having either an alkyl or aryl side chain, such as sodium xylene sulfonate or the like with an alkyl amine saponifying agent that there could be provided to the art a fatty acid lubricant which was highly dilutable and, therefore, highly efficacious in the lubrication of the poly (alkylene) terephthalate articles, and which was believed to inhibit stress crack formation even at a pH 7.

Then, as the technology evolved and as disclosed in the '801 patent, it was found that stress crack inhibition of PET articles actually did occur with fatty acid lubricants at pH greater than 7. Specifically, it was found that the hydrophilic substituted aromatic hydrocarbon was acting as a stress crack inhibitor in the lubricant concentrate.

Subsequently, and as disclosed and taught in the '280 patent, it was found that, at use levels, the amine was the primary stress cracking inhibitor, but which stress cracking inhibition capabilities were enhanced and buttressed by the aromatic hydrocarbon.

However, in order to be highly efficacious as a stress crack inhibiting lubricant, the dilution ratios of the concentrate could not be achieved in the manner comparable to that disclosed in the '375 patent. Thus, to date, the art has witnessed the development of a fatty acid lubricant which exhibits both excellent lubricating properties, cleaning properties and, concomitantly, inhibits stress crack formation in PET articles in an alkaline environment. Moreover, at least in a bottling operation, it is highly desirable that a lubricant be efficacious in lubricating the tracks upon which the various types of containers translate i.e. cans, glass and PET articles. The fatty acid lubricants disclosed in the above-referred to patents are efficacious in conjunction with any of these types of containers. Thus, the lubricants disclosed in the above-referred to patents are "universal" lubricants in their application to various beverage containers and their ability to inhibit the stress cracking ordinarily encountered with PET articles. However, and as noted, the dilutability of these lubricants, as the stress cracking properties has been enhanced, has diminished. Thus, it would be highly desirable to provide a "universal" fatty acid-based lubricant which could approach the dilution levels disclosed in the '375 patent.

Moreover, because of the cost of raw materials, the art has looked to alternatives for fatty acid lubricants, i.e. synthetic diamine lubricants, such as disclosed in PCT International Publication No. WO 92/130580, U.S. Pat. No. 5,062,978, and various other prior art.

These lubricants provide adequate lubricity, cleaning ability and the like, and have a much lower production cost. However, the ability of these lubricants to inhibit or minimize the stress cracking capabilities of PET articles in a alkaline environment and their corrosivity renders these lubricants suspect.

Thus, while providing high dilution capabilities, it would also be desirable to provide a synthetic diamine lubricant which is stress crack inhibiting, while being still applicable to other types of beverage containers.

It is to these purposes to which the present invention is directed.

SUMMARY OF THE INVENTION

In a first aspect hereof a highly dilutable fatty acid-based lubricant is prepared from a lubricant concentrate comprising:
(a) a fatty acid, at least a-portion of which is myristic acid,
(b) a saponifying agent for the fatty acid comprising and amine having at least 6 carbon atoms, (c) a hydrophilic-substituted aromatic hydrocarbon having an alkyl or aryl side chain,
(d) a chelant or sequestrant, and
(e) water.

By employing myristic acid as a portion of the fatty acid, there is provided a highly dilutable lubricant, which can be diluted in an amount ranging from about 1/500 to 1/2000 (0.2-0.05%) with water, which exhibits excellent lubricity, inhibits stress cracking in PET articles, is equally applicable as a lubricant with other beverage-type containers, such as glass or aluminum cans, at elevated pH levels.

In another aspect of the present invention improved highly alkaline synthetic diamine lubricants and lubricant concentrates are prepared by admixing with the synthetic diamine a water-soluble amine hydrotrope for the synthetic diamine. Preferably, the water soluble amine is an ethoxylated amine. By using an ethoxylated amine the stress crack inhibition capabilities of the diamine is enhanced.

For a more complete understanding of the present invention references made to the following detailed description and accompanying examples.

DESCRIPTION OF THE PREFERRED EMBODIMENTS

Now, and in accordance with the present invention, and in a first embodiment hereof, highly dilutable, fatty acid, alkaline lubricants, which evidences stress crack inhibiting properties, comprises:
(a) a fatty acid, at least a portion of which is a myristic acid,
(b) a saponifying agent comprising an amine having at least 6 carbon atoms,
(c) a hydrophilic-substituted aromatic hydrocarbon having an alkyl or aryl side chain,
(d) a sequestrant, and
(e) water.

The lubricant is prepared by diluting a concentrate of the same components, with water, at a dilution ratio on a volumetric basis, of 1/200 to 1/2000, and preferably, 1/500 to 1/1000.

More particularly, the concentrate comprises, by weight:
(a) from about 0.25 to 35 percent of the fatty acid,
(b) from about 2 to 10 percent of the saponifying agent,
(c) from about 2 to 20 percent of the sequestrant, or
(d) at least about 10 to about 35 percent of the aromatic hydrocarbon, and
(e) from about 5 to 75 percent of water.

Preferably, the concentrate comprises, by weight:
(a) from about 5 to 10 percent of the acid,
(b) from about 3 to 6 percent of the aromatic saponifying agent,
(c) from about 7 to 15 percent of the chelant,
(d) from about 20 to 30 percent of the aromatic hydrocarbon, and
(e) from about 34 to 67 percent of water.

The use solution is prepared by admixing the concentrate with water at ambient conditions.

The fatty acid comprises at least twenty (20%) percent, by weight, of myristic acid and, preferably, from about twenty (20%) percent to about fifty (50%) by weight. The fatty acid used herein is myristic acid. Myristic acid is a purer form of coconut fatty acid. However, it has been found that the high levels of dilutability are not afforded by coconut fatty acid. Thus, the use of myristic acid is essential herein within the prescribed ranges. The myristic acid is admixed with another fatty acid to form the fatty acid component hereof. Representative of the other fatty acids which may be used include coconut oil fatty acid, lauric acid, palmetic acid, oleic acid, linoleic acid, acid, and the like, as well as mixtures thereof.

The hydrophilic-substituted aromatic hydrocarbon having an alkyl or aryl side chain, optimally, is the sodium salt of a hydrophilic-substituted aromatic hydrocarbon having an alkyl or aryl side chain and, in particular, the sodium salt of a sulfonated aromatic hydrocarbon having an alkyl or aryl side chain.

Representative of the type of compound contemplated herein is, for example, sodium xylene sulfonate, sodium decyl diphenyl oxide, sodium dimethyl naphthalene sulfonate, sodium salts or linear alkyl benzene sulfonates, ordinarily having from about $C_6$ to about $C_{12}$ in the alkyl portion and the like, as well as mixtures thereof. The preferred compound is sodium dimethyl naphthalene sulfonate.

It should be noted, and as is apparent, that those compounds are, also, solubilizing agents, as well as anionic surfactants. This contributes to the solubilizing of the fatty acid and the detergency of the lubricant prepared therefrom.

As noted hereinabove, the saponifying agent comprises an amine having at least six carbon atoms. A particularly preferred class of saponifying agents for use herein are free-base amines, including primary, secondary and tertiary amines.

Various free base alkyl amines can be successfully employed in this invention. The alkyl amine saponifying agents useful herein are preferably, amines having the general formula:

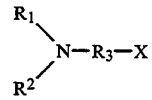

wherein $R_1$ and $R_2$ are hydrogen, alkoxylate, or alkyl, $R_3$ is an unsubstituted linear alkyl group having from 2 to 12 carbon atoms and, preferably, from 6 to 10 carbon atoms and X is either hydrogen or a hydrophilic group.

Where X is hydrogen, among the useful amines are for example, decyl dimethyl amine, N,N-dimethyl octyl amine, octyl amine, nonyl amine, decyl amine, ethyl octyl amine, ethyl hexyl amine and 2-ethyl-l-hexamine and the like, as well as mixtures thereof. The preferred amine is N, N-dimethyl octyl amine.

Useful hydrophilic groups include, for example, $-NH_2$, $-OH$, $SO_3$, alkoxylate, and the like.

However, because of the toxicity normally associated with alkyl amines, it is more advantageous to employ either alcohol or alkoxylated, and in particular, ethoxylated amines as the saponifying agent.

When X is OH, among the useful alcohol amines are primary, secondary and tertiary alcohol amines. Representative of such compounds are, for example, monoethanol amine, diethanol amine, triethanolamine, dimethyl amino ethanol, and the like as well as mixtures thereof.

When X is $-NH_2$, a particularly useful amine is dimethyl amino propyl amine. When X is $SO_3$, a useful compound is dimethyl taurine.

Among the useful alkoxylated amines are the ethoxylated amine for example, tallow (ethoxylated) amine, coconut (ethoxylated) amine. These compounds are well known and commercially available.

In practicing the present invention the preferred amine is coconut (ethoxylated) amine.

As hereinabove noted the amine is employed as the free-base amine.

Likewise, conventional saponifying agents such as sodium hydroxide, may be used in admixture with the free-base amine, since it has been found that the sodium cation does not attack the article.

The lubricant concentrate also contains a hardness sequestrant or chelant, for the purpose of sequestering $Mg^+$ and $CA^+$ ions present in the water. The sequestrant may comprise either an organic or inorganic sequestrant. Useful organic sequestrants are alkali metal salts of ethylene diamine tetracidic acid (EDTA), gluconic acid, phosphonic acid, nitrilotriacetic acid (NTA) and the like, as well as mixtures thereof. Examples of inorganic sequestrants are the phosphate hardness sequestrants, such as sodium tripolyphosphate. Although any of the enumerated sequestrants may be effectively integrated herein, preferably, the alkali metal salt of EDTA is employed. Na-EDTA sold under the trade name Versene R and available from Dow Chemical Corporation is utilized herein. Where used, and as noted, the hardness sequestrant is present in an amount of between about 2 and about 15 parts by weight based on total concentrate weight.

In preparing a lubricant concentrate in accordance herewith the aromatic hydrocarbon and the water are mixed together and heated to a temperature of about 100° F. to 120° F. While maintaining this temperature, the sequestrant, acid saponifier and fatty acid, are sequentially added, in that order, to the solution, with mixing after the addition of each component.

To form a use solution, the present concentrate is diluted with water in a respective weight ratio, ranging from about 1/200 to about 1/2000, and, in particular, from about 1/500 to about 1/1000. The use solution is prepared by mixing the concentrate with water.

The fatty acid lubricant hereof has a pH of at least about 7.5 and preferably from about 8 to about 11. In practicing the present invention adjuvants such as hexylene glycol and other alcohols may be admixed herewith without affecting the properties of the lubricant.

In accordance with a second aspect hereof a cationic diamine-based lubricant at a pH greater than 7, generally comprises:
(a) a diamine lubricant,
(b) a water-soluble amine hydrotrope, and
(c) water.

The lubricant is prepared from a lubricant concentrate comprising, by weight:
(a) from about 0.5 to about 15 percent of the diamine,
(b) from about 1 to about 45 percent of the hydrotrope, and
(c) from about 40 to about 95 percent of water.

Preferably, the concentrate comprises:
(a) from about 2 to about 10 percent of the diamine,
(b) from about 5 to about 20 percent of the hydrotrope, and
(c) from about 60 to about 90 percent of water.

The lubricant is prepared by diluting the concentrate with water in a volumetric ratio of concentrate to water ranging from about 1/200 to about 1/2000 and, preferably, from about 1/500 to about 1/1000.

Heretofore, and as shown in the prior art, synthetic diamine lubricants have been neutralized with a weak acid, such as acetic acid or the like. Herein, no such neutralization occurs. Rather, the unneutralized diamine, which is alkaline, is hydrotroped in to aqueous solution using the water soluble amine. It is noteworthy that, traditionally, the synthetic diamine lubricants are oil-soluble. Therefore, the use of the water-soluble amine enables the formation of an water-soluble lubricant having a pH greater than 7 therefrom.

Any water-soluble amine which can hydrotrope the diamine can be used herein. Among the useful amines are monoamines, diamines, triamines, tetraamines, pentaamines and the like. These amines may be substituted or unsubstituted. Preferably, ethoxylated amines are employed.

Representative of the useful amines are those water-soluble amines enumerated hereinabove.

Preferably, the hydrotrope or solubilizing agent is an oxyalkylated amine solubilizing agent selected form the group consisting of oxyalkylated N-alkylamines and oxyalkylated N-alkyl-alkylenediamines.

The oxyalkylated amine solubilizing agent is selected from the group consisting of oxyalkylated N-alkylamines, and oxyalkylated N-alkyl-alkylene diamines. Examples of oxyalklated N-alkylamines are the oxyalkylated fatty amines such as oxyalkylated N-cocoamine, N-stearylamine, N-palmitylamine, and the like. The N-alkyl group should have from 8 to about 24 carbon atoms, preferably 12–20 carbon atoms, and more preferably, 15–18 carbon atoms. This group may be unsaturated, having from 1–4 sites of unsaturation, preferably 1–2 sites of unsaturation. Such amines correspond to the formula:

R—NHC 

where R is a $C_{18}$–$C_{24}$ alkyl or alkenyl group.

The polyolalkylene ether portion of the oxyalkylated N-alkylamine is preferably derived completely from ethylene oxide, and is thus a polyoxethylated N-alkylamine. However, block and heteric polyoxyethylene/polyoxypropylene copolymeric N-alkylamines are also suitable, particularly, hose block copolymers having an internal polyoxyethylene block capped with a polyoxypropylene block. Use of other alkylene oxides such as butylene oxide, amylene oxide, and the higher alkylene oxides such as the Vikolox ® alkylene oxides having from 8–18 carbon atoms in the alkylene residue are also suitable. If alkylene oxides with a $C_8$ or greater alkylene residue are used, then not more than about 4 moles of said alkylene oxide, preferably 2 moles should be used, as a cap. Preferably, the oxyalkylation is performed with substantially all ethylene oxide. From 6 to about 40 moles, preferably from 10 to about 30 moles, and most preferably, from 12 to about 16 moles of ethylene oxide should be used.

The N-alkyl-alkylenediamines correspond to the formulae:

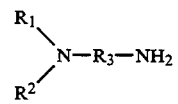

These are oxyalkylated preferably in the same manner as the oxyalkylated alkylamines, i.e. under suitable oxyalkylation conditions known to the skilled artisan. $R_1$ is preferably a $C_8$–$C_{20}$ linear or branched alkyl group, optionally containing unsaturation, more preferably a $C_{12}-C_{18}$ alkyl, and most preferably $C_{15}-C_{18}$ alkyl. $R_2$ is an alkylene residue containing from 2 to 6 carbon atoms, preferably 3-6 carbon atoms, for example 1,3-propylene, 1,4-butylene, 1,5-pentylene, or 1,6-hexylene (1,6-hexamethylene). Most preferably, $R_2$ is trimethylene, $R^1$ is $C_{13}-C_{15}$, and the oxyalkylation is all ethylene oxide derived. A suitable oxyalkylated N-alkyl alkylenediamine is Synprolam ® 35 3Nx10, available from Imperial Chemical Inc. (ICI).

The oil-soluble diamines used herein are diprimary amines having an alkylene residue which may be straight chain or branched, containing from 12 to 24 carbon atoms, preferably 15-20 carbon atoms, and most preferably 16-18 carbon atoms. Preferably, the alkylene group further contains unsaturation. Examples of suitable diamines are oleyldiamine, linoleyldiamine, stearyldiamine, 2-ethyldodecane diamine, and the like. Such diamines are available from several commercial sources; oleyldiamine, for example, as Adogen ® 572 from Sherex Chemical. Mixtures of diamines may be used.

Within the practice of the present invention the water soluble hydrotrope is, preferably, selected from the group consisting of tallow (ethoxylated) amine, cocoa (ethoxylated) amine and mixtures thereof.

The lubricant solutions, which are advantageously supplied in the form of concentrates which are subsequently diluted for use, also may contain additional ingredients such as corrosion inhibitors, bacteriocides, fungicides, mildewcides and other antimicrobial agents, such as quaternary ammonium compounds and the like. Likewise, the composition may contain sludge preventing compounds, to obviate the sludge encountered in breweries on glass and cans.

In preparing the synthetic amine lube, the components are mixed together at ambient temperatures.

The pH of the lubricant is equal to or greater than 8 so that it is an alkaline lube.

It has been observed that the synthetic diamine lube exhibits enhanced lubricity, and depending upon the choice of water soluble amine can inhibit stress cracking in PET articles at high dilution. Because of the alkaline nature of the lubricant it is effective in neutralizing acidic spillages such as soda pop and the like. Also, these amine lubes exhibit reduced corrosivity.

For a more complete understanding of the present invention, references made to the following non-limiting examples. In the examples, which are to be construed as illustrative, rather than limitative, of the present invention, all parts are by weight absent indications to the contrary.

EXAMPLE I

This example illustrates the preparation of a myristic acid-containing highly alkaline fatty acid lubricant concentrate.

Into a suitable reaction equipped with heating means and stirring means is added the following in sequential order, at 120° F., with stirring:

| Ingredient | Amt, pbw |
|---|---|
| Water, deionized | 30 |
| sodium naphthalene sulfonate (1) | 20 |
| Ethoxylated Amine 1 (2) | 5 |
| Ethoxylated Amine 2 (3) | 5 |
| EDTA (4) | 10 |
| Hexylene glycol | 8 |
| KOH, 45% | 7 |
| Oleic fatty acid | 10 |

-continued

| Ingredient | Amt, pbw |
|---|---|
| Myristic fatty acid | 5 |

(1) a commercially available product sold by DeSota Chemical under the name PETRO BA
(2) a coconut ethoxylated amine sold by Sherex Chemical under the name Varonic K215
(3) a coconut ethoxylated amine sold by Sherex Chemical under the name Varonic K205
(4) a 30% solution of EDTA sold by Dow Chemical under the name Versene

EXAMPLE II

Following the procedure of Example I, a series of fatty acid lubricant concentrates were prepared. The following table sets forth the ingredients and their amounts.

| Ingredient | Amt, pbw | |
|---|---|---|
|  | Sample 1 | Sample 2 |
| Water, Deionized | 38 | 36 |
| Sodium Napthalene Sulfonate (1) | 20 | 20 |
| Coconut Ethoxylated Amine 1 (2) | 5 | 5 |
| Coconut Ethoxylated Amine 2 (3) | 5 | 5 |
| EDTA, liquid (4) | 10 | 10 |
| Hexylene glycol | — | 5 |
| KOH, 45% | 7 | 7 |
| Oleic fatty acid | 7 | 10 |
| Coconut fatty acid | 6 | — |
| Myristic fatty acid | 2 | 5 |

EXAMPLE III

Each of the above formulae were tested for stress crack inhibition at high dilution levels in accordance with the following procedure:

For each lubricant concentrate, five-footed PET bottles were filled with 1850 parts of ice water and 45 parts each of citric acid and sodium bicarbonate. Each bottle was capped and placed into a lubricant, prepared from 1500 parts of soft water and one part of the lubricant concentrate, such that the feet were immersed in the lubricant, for a period of twenty-four hours, at ambient temperatures.

Thereafter, each bottle was removed from the lubricant, depressurized by removing the cap and visually inspected for stress cracks.

Each sample showed improved stress crack inhibition over a control lubricant(i), with the bottle immersed in formula Example I evidencing no stress cracks.

From the above it is seen that the use of myristic acid as a fatty acid component enables a highly diluted stress crack inhibiting, highly alkaline fatty acid lubricant.

(i) a central lubricant of 52 parts of water; 20 parts of PETRO BA, 7 parts of a 45% solution of KOH, 7 parts of liquid EDTA, and 7 parts each of coconut fatty acid and aleic fatty acid.

EXAMPLE IV

This example illustrates the preparation of a synthetic diamine lubricant in accordance with the present invention.

Into a suitable container equipped with stirring means and at ambient temperatures were mixed the following:

| Ingredient | Amt., pbw |
|---|---|
| Synthetic Diamene(1) | 9.5 |

| Ingredient | Amt., pbw |
|---|---|
| Quaternary Ammonium Compound[2] | 9.0 |
| Water-Soluble Amine Hydrotrope[3] | 10.0 |
| Water | 72.0 |

[1] an alkyl diamine sold by Sherex Chemical under the name ADOGEN 572
[2] a commercially available product sold by Stepan under the name BTC 2125
[3] a coconut (ethoxylated) amine sold by Sherex Chemical under the name VARONIC K215

From the above it is to be seen that by using the combination of myristic acid as a component of the fatty acid, not only are highly dilutable fatty acid lubes provided, but one which inhibits stress cracking in PET articles, but which can, also, be used on other others such as glass, cans and the like. Additionally, the lubricants are not limited in usage to beverage containers, but to other articles of manufacture where fatty acid lubricants are desired.

Concomitantly, the utilization of the water-soluble amines and, in particular, the ethoxylated amines, enables the production of synthetic diamine lubricants which can be used on various containers and articles with a lessening of corrosivity, excellent lubricity, cleaning and the like.

Having, thus, described the invention what is claimed is:

1. In an aqueous lubricant composition of the type having a pH greater than 8 and a lubricant component which must be either hydrotroped or saponified, the improvement which comprises: a water-soluble amine as a hydrotrope-saponifying agent, the water-soluble amine having at least six carbon atoms, and wherein the lubricant component is not neutralized.

2. The improvement of claim 1 wherein: the lubricant is a fatty acid lubricant comprising a mixture of a lubricant concentrate and water in a dilution ratio of concentrate to water ranging from about 1/500 to 1/2000 and, wherein, at least a portion of the fatty acid component is myristic acid.

3. The improvement of claim 2, wherein the water soluble amine is coconut (ethoxylated) amine.

4. The improvement of claim 1, wherein the lubricant is an aqueous-based lubricant wherein:
the lubricant component comprises a synthetic diamine.

5. The improvement of claim 4, wherein the water soluble amine is coconut (ethoxylated) amine.

6. The improvement of claim 5, wherein the amine is present as a free-base amine.

* * * * *